United States Patent
Newman et al.

(10) Patent No.: US 9,740,324 B2
(45) Date of Patent: Aug. 22, 2017

(54) VEHICLE ACCESSORY CONTROL INTERFACE HAVING CAPACITIVE TOUCH SWITCHES

(71) Applicant: UUSI, LLC, Reed City, MI (US)

(72) Inventors: Todd R. Newman, Traverse City, MI (US); John M. Washeleski, Cadillac, MI (US)

(73) Assignee: UUSI, LLC, Reed City, MI (US)

( * ) Notice: Subject to any disclaimer, the term of this patent is extended or adjusted under 35 U.S.C. 154(b) by 0 days.

(21) Appl. No.: 14/700,731

(22) Filed: Apr. 30, 2015

(65) Prior Publication Data

US 2015/0234531 A1    Aug. 20, 2015

Related U.S. Application Data

(63) Continuation of application No. 12/496,938, filed on Jul. 2, 2009, now Pat. No. 9,046,967.

(51) Int. Cl.
  *G06F 3/041* (2006.01)
  *G06F 3/044* (2006.01)
  *G06F 3/0354* (2013.01)

(52) U.S. Cl.
  CPC ........ *G06F 3/0416* (2013.01); *G06F 3/03547* (2013.01); *G06F 3/044* (2013.01); *G06F 2203/04105* (2013.01)

(58) Field of Classification Search
  CPC ...... G06F 3/044; G06F 3/0412; G06F 3/0416; G06F 2203/04104; G06F 3/04886; G06F 3/0482; G06F 3/03547

(Continued)

(56) References Cited

U.S. PATENT DOCUMENTS

| 4,933,807 A | 6/1990 | Duncan |
| 5,621,290 A | 4/1997 | Heller et al. |

(Continued)

FOREIGN PATENT DOCUMENTS

| EP | 2613232 A1 | 7/2013 |
| WO | 0127868 A1 | 4/2001 |
| WO | 2005114369 A2 | 12/2005 |

OTHER PUBLICATIONS

Supplementary European Search Report for Application No. EP 10 79 4685 dated Apr. 3, 2014.

(Continued)

*Primary Examiner* — Hong Zhou
(74) *Attorney, Agent, or Firm* — Howard & Howard Attorneys PLLC

(57) ABSTRACT

A system including a control interface including a display panel and a processor, the display panel including a touch surface, an electronically non-conductive touch surface, and a plurality of touch areas having an array of electrically conductive rows and columns, which capacitivily couples to a conductive object, moving into close proximity to one of the conductive rows and columns, while being driven with an electrical charge, and the processor detecting the capacitive coupling of the conductive row to the conductive object, generating a signal and providing the signal wirelessly to one of an accessory and remote device, based on a first movement, followed by a second movement when a pattern or sequence has been detected, remotely communicating to a wireless device using a transceiver associated with the processor, and controlling at least one of the remote accessories in accordance with an output command from the wireless device.

11 Claims, 4 Drawing Sheets

(58) Field of Classification Search
USPC .................. 345/173–174, 168; 178/18.06
See application file for complete search history.

(56) References Cited

U.S. PATENT DOCUMENTS

| | | | |
|---|---|---|---|
| 5,730,165 A | 3/1998 | Philipp | |
| 5,801,340 A | 9/1998 | Peter | |
| 5,832,397 A | 11/1998 | Yoshida et al. | |
| 5,952,801 A | 9/1999 | Boisvert et al. | |
| 5,986,421 A | 11/1999 | Fukazawa et al. | |
| 6,064,165 A | 5/2000 | Boisvert et al. | |
| 6,144,114 A * | 11/2000 | Chutorash | B60R 16/0373 |
| | | | 307/10.1 |
| 6,233,872 B1 | 5/2001 | Glagow et al. | |
| 6,337,549 B1 | 1/2002 | Bledin | |
| 6,346,935 B1 | 2/2002 | Nakajima et al. | |
| 6,377,009 B1 | 4/2002 | Philipp | |
| 6,389,752 B1 | 5/2002 | Rosenau | |
| 6,404,158 B1 | 6/2002 | Boisvert et al. | |
| 6,499,359 B1 | 12/2002 | Washeleski et al. | |
| 6,555,982 B2 | 4/2003 | Tyckowski | |
| 6,782,759 B2 | 8/2004 | Shank et al. | |
| 6,936,986 B2 | 8/2005 | Nuber | |
| 6,946,853 B2 | 9/2005 | Gifford et al. | |
| 6,968,746 B2 | 11/2005 | Shank et al. | |
| 7,015,666 B2 | 3/2006 | Staus | |
| 7,030,860 B1 * | 4/2006 | Hsu | G06F 3/044 |
| | | | 178/18.06 |
| 7,038,414 B2 | 5/2006 | Daniels et al. | |
| 7,132,642 B2 | 11/2006 | Shank et al. | |
| 7,162,928 B2 | 1/2007 | Shank et al. | |
| 7,293,467 B2 | 11/2007 | Shank et al. | |
| 7,312,591 B2 | 12/2007 | Washeleski et al. | |
| 7,342,373 B2 | 3/2008 | Newman et al. | |
| 7,421,321 B2 | 9/2008 | Breed et al. | |
| 7,449,852 B2 | 11/2008 | Washeleski et al. | |
| 7,518,327 B2 | 4/2009 | Newman et al. | |
| 7,576,631 B1 | 8/2009 | Bingle et al. | |
| 7,653,883 B2 | 1/2010 | Hotelling et al. | |
| 7,813,025 B2 | 10/2010 | Ribi | |
| 8,040,326 B2 | 10/2011 | Hotelling et al. | |
| 2001/0052839 A1 | 12/2001 | Nahata et al. | |
| 2002/0039008 A1 | 4/2002 | Edgar et al. | |
| 2002/0055811 A1 | 5/2002 | Obradovich | |
| 2002/0152010 A1 | 10/2002 | Colmenarez et al. | |
| 2002/0190961 A1 | 12/2002 | Chen | |
| 2004/0046452 A1 * | 3/2004 | Suyama | B60R 25/00 |
| | | | 307/10.2 |
| 2004/0119688 A1 * | 6/2004 | Troxell | G06F 3/044 |
| | | | 345/156 |
| 2004/0233677 A1 | 11/2004 | Su et al. | |
| 2005/0012484 A1 | 1/2005 | Gifford et al. | |
| 2005/0251314 A1 | 11/2005 | Schindler et al. | |
| 2006/0006701 A1 | 1/2006 | Wells | |
| 2006/0097991 A1 * | 5/2006 | Hotelling | G06F 3/0416 |
| | | | 345/173 |
| 2006/0161871 A1 | 7/2006 | Hotelling et al. | |
| 2006/0229811 A1 | 10/2006 | Herman et al. | |
| 2006/0238517 A1 | 10/2006 | King et al. | |
| 2007/0075986 A1 * | 4/2007 | Chen | G06F 3/0418 |
| | | | 345/173 |
| 2007/0152615 A1 | 7/2007 | Newman et al. | |
| 2007/0257890 A1 | 11/2007 | Hotelling et al. | |
| 2008/0048997 A1 * | 2/2008 | Gillespie | G06F 3/03547 |
| | | | 345/174 |
| 2008/0147308 A1 | 6/2008 | Howard et al. | |
| 2009/0079705 A1 | 3/2009 | Sizelove et al. | |
| 2009/0179988 A1 | 7/2009 | Reibel et al. | |
| 2009/0193361 A1 | 7/2009 | Lee et al. | |
| 2009/0198420 A1 | 8/2009 | Newman et al. | |
| 2009/0210110 A1 | 8/2009 | Dybalski et al. | |
| 2009/0219134 A1 | 9/2009 | Nakasato et al. | |
| 2009/0244017 A1 | 10/2009 | Pala et al. | |
| 2009/0309851 A1 | 12/2009 | Bernstein | |
| 2010/0001971 A1 | 1/2010 | Jiang et al. | |
| 2010/0097346 A1 | 4/2010 | Sleeman | |
| 2010/0188248 A1 * | 7/2010 | Sultan | B60R 25/1003 |
| | | | 340/12.53 |
| 2010/0188343 A1 | 7/2010 | Bach | |
| 2010/0222939 A1 | 9/2010 | Namburu et al. | |
| 2010/0260350 A1 | 10/2010 | Chutorash et al. | |
| 2010/0295812 A1 * | 11/2010 | Burns | G06F 3/0412 |
| | | | 345/174 |
| 2010/0302201 A1 * | 12/2010 | Ritter | G06F 3/044 |
| | | | 345/174 |
| 2011/0080363 A1 | 4/2011 | Kao et al. | |
| 2011/0246026 A1 | 10/2011 | Shuster | |
| 2012/0038559 A1 | 2/2012 | Radivojevic et al. | |
| 2012/0316702 A1 * | 12/2012 | Liu | G01C 21/3688 |
| | | | 701/2 |
| 2014/0028542 A1 | 1/2014 | Lovitt et al. | |
| 2014/0300561 A1 | 10/2014 | Waller et al. | |

OTHER PUBLICATIONS

Extended European Search Report for Application No. EP 14 18 4912 dated Apr. 17, 2015.

Buxton, B., "31.1: Invited Paper: A Touching Story: A Personal Perspective on the History of Touch Interfaces Past and Future," Society for Information Display (SIDS) Symposium Digest of Technical Papers, vol. 41, No. 1, Session 31, May 2010, pp. 444-448.

Hinckley, K., et al., "38.2: Direct Display via Simultaneous Pen + Multi-touch Input," Society for Information Display (SID) Symposium Digest of Technical Papers, vol. 41, No. 1, Session 38, May 2010, pp. 537-540.

Lee, S., "A Fast Multiple-Touch-Sensitive-Input Device," University of Toronto, Department of Electrical Engineering, Master Thesis, Oct. 1984, 118 pages.

Hillis, W.D. "A High-Resolution Imaging Touch Sensor," The International Journal of Robotics Research, vol. 1, No. 2, Summer (Jun.-Aug. 1982), pp. 33-44.

Lee, S.K., et al., "A Multi-Touch Three Dimensional Touch-Sensitive Tablet," Proceedings of the SIGCHI Conference on Human Factors in Computing Systems, Apr. 1985, pp. 21-25.

Hlady, A.M., "A touch sensitive X-Y position encoder for computer input," Proceedings of the Fall Joint-Computer Conference, Nov. 18-20, 1969, pp. 545-551.

Sasaki, L., et al., "A Touch-Sensitive Input Device," International Computer Music Conference Proceedings, Nov. 1981, pp. 293-296.

Callaghan, J., et al., "An Empirical Comparison of Pie vs. Linear Menus," Human Factors in Computing Systems: Chicago '88 Conference Proceedings: May 15-19, 1988, Washington DC: Special Issue of the SIGCHI Bulletin, New York, Association for Computing Machinery, pp. 95-100.

Casio, AT-550 Advertisement, published in Popular Science by on the Run, Feb. 1984, p. 129.

Casio, "Module No. 320," AT-550 Owner's Manual, at least as early as Dec. 1984, 14 pages.

Boie, R.A., "Capacitive impedance Readout Tactile Image Sensor," Proceedings of the IEEE International Conference on Robotics and Automation, vol. 1, Mar. 1984, pp. 370-372.

Thompson, C., "Clive Thompson on the Breakthrough Myth," Wired Magazine, http://www.wires.com/magazine/2011/07/st_thompson_breakthrough, Aug. 2011, 3 pages.

"Innovation in Information Technology," National Research Council of the National Academies, Computer Science and Telecommunications Board, Division of Engineering and Physical Sciences, http://www.nap.edu/catalog/10795.html, 2003, 85 pages.

Buxton, W., et al., "Large Displays in Automotive Design," IEEE Computer Graphics and Applications, Jul./Aug. 2000, pp. 68-75.

Buxton, W., "Lexical and Pragmatic Consideration of Input Structures," ACM SIGGRAPH Computer Graphics, vol. 17, No. 1, Jan. 1983, pp. 31-37.

Betts, P., et al., "Light Beam Matrix Input Terminal," IBM Technical Disclosure Bulletin, Oct. 1966, pp. 493-494.

(56) References Cited

OTHER PUBLICATIONS

Buxton, B., "Multi-Touch Systems that I Have Known and Loved," downloaded from http://www.billbuxton.com/multitouchOverview.html, Jan. 12, 2007, ww pages.

Herot, C.F., et al., "One-Point Input of Vector Information for Computer Displays," Proceedings of the 5th Annual conference on Computer Graphics and Interactive Techniques, Aug. 23-25, 1978, pp. 210-216.

Wolfeld, J.A., "Real Time Control of a Robot Tactical Sensor," University of Pennsylvania, Department of Computer & Information Science, Technical Reports (CIS), Master Thesis, http://resposi-tory.upenn.edu/cis reports/678, Aug. 1981, 68 pages.

Lewis, J.R., "Reaping the Benefits of Modern Usability Evaluation: The Simon Story," Advances in Applied Ergonomics: Proceedings of the 1st International Conference on Applied Ergonomics, ICAE May 21-24, 1996, pp. 752-755.

Narkatani, L.H., et al., "Soft Machines: A Philosophy of User-Computer Interface Design," Proceedings of the SIGCHI Conference on Human Factors in Computing Systems, Dec. 1983, Chicago, pp. 19-23.

Rubine, D.H., "The Automatic Recognition of Gestures," Carnegie Mellon University, Master Thesis, CMU-CS-91-202, Dec. 1991, 285 pages.

Kurtenbach, G.P., "The Design and Evaluation of Marking Menus," University of Toronto, Graduate Department of Computer Science, Master Thesis, May 1993, 201 pages.

Hopkins, D., "The Design and Implementation of Pie Menus," originally published in Dr. Dobb's Journal, Dec. 1991, lead cover story, user interface issue, reproduced at www.DonHopkins.com, 8 pages.

Buxton, B., "The Long Nose of Innovation," Bloomberg Businessweek, Innovation & Design, Jan. 2, 2008, 3 pages, downloaded from http://www.businessweek.com/stories/2008-01-02/the-long-nose-of-innovationbusinessweek-business-news-stock-market-and-financialadvice.

Buxton, B., "The Mad Dash Toward Touch Technology," Bloomberg Businessweek, Innovation & Design, Oct. 21, 2009, 3 pages, downloaded from http://www.businessweek.com/innovate/content/oct2009/d20091021_629186.htm.

"The Sensor Frame Graphic Manipulator," NASA Phase II Final Report, NASA-CR-194243, May 8, 1992, 28 pages.

Izadi, S., et al., "ThinSight: A Thin Form-Factor Interactive Surface Technology," Communications of the ACM, Research Highlights, vol. 52, No. 12, Dec. 2009, pp. 90-98.

Krueger, M.W., et al., "VIDEOPLACE—An Artificial Reality," Proceedings of the SIGCHI Conference on Human Factors in Computing Systems, Apr. 1985, pp. 35-40.

Brown, E., et al., "Windows on Tablets as a Means of Achieving Virtual Input Devices," Proceedings of the IFIP TC13 Third International Conference on Human-Computer Interaction, Aug. 27-31, 1990, in D. Diaper, et al. (Eds), Human-Computer Interaction—INTERACT '90, Amsterdam: Elsevier Science Publishers B.V. (North Holland), 11 pages.

"A Multi-Touch Three Dimensional Touch-Sensitive Tablet," http://www.youtube.com/watch?v=Arrus9CxUiA, Nov. 18, 2009, 1 page.

"Casio AT-550 Touch Screen Calculator Watch (1984)," http://youtube.com/watch?v=UhVAsqhfhqU, May 24, 2012, 1 page.

International Searching Authority, International Search Report for corresponding PCT/US2010/40541 mailed Sep. 1, 2010.

International Searching Authority, Written Opinion for corresponding PCT/US2010/40541 mailed Sep. 1, 2010.

International Preliminary Report on Patentability for International Application No. PCT/US10/40541 dated Jan. 3, 2012.

Smith, S.D., et al., "Bit-slice microprocessors in h.f. digital communications," The Radio and Electronic Engineer, vol. 51, No. 6, Jun. 1981, pp. 29-301.

Buxton, W., et al., "Issues and Techniques in Touch-Sensitive Tablet Input," Proceedings of SIGGRAPH '85, vol. 19, No. 3 Jul. 22-26, 1985, pp. 215-223.

Non-Final Office Action mailed Dec. 17, 2015 for Utility U.S. Appl. No. 14/028,941.

Final Office Action mailed Jun. 16, 2016 for Utility U.S. Appl. No. 14/028,941.

Non-Final Office Action mailed Jan. 12, 2017 for Utility U.S. Appl. No. 14/028,941.

\* cited by examiner

VEHICLE ACCESSORY CONTROL INTERFACE HAVING CAPACITIVE TOUCH SWITCHES

CROSS-REFERENCE TO RELATED APPLICATIONS

This application is a continuation of application Ser. No. 12/496,938, filed on Jul. 2, 2009, the entire contents of which are incorporated by reference herein.

BACKGROUND OF THE INVENTION

1. Field of the Invention

The present invention relates to a control interface of a vehicle in which the control interface has input controls for enabling an occupant of the vehicle to control an accessory of the vehicle.

2. Background Art

A vehicle such as an automobile has one or more control interfaces for enabling an occupant of the vehicle to control corresponding accessories of the vehicle. Each control interface includes one or more input controls ("controls") which an occupant manipulates to control an accessory corresponding to the control interface. Each control interface may further include a display for displaying status information of an accessory corresponding to the control interface.

For example, one control interface, referred to as the instrument cluster, is behind the steering wheel for access by the driver of the vehicle. Another control interface, referred to as the center stack console, is between the driver and front passenger seats for access by both of the driver and the front passenger. Other areas of a vehicle having control interfaces include door armrests where window, mirror, and security controls are placed and overhead consoles where sunroof and interior lighting controls are placed.

A control interface such as the center stack console includes controls and a display which are associated with multiple accessories such as audio, navigation, and HVAC (heating, ventilating, and air conditioning) accessories. The surface of the control interface is divided into adjacent areas each being associated with an accessory. Each area of the control interface has controls positioned adjacent to a portion of the display. The controls are typically implemented as mechanical switches such as pushbutton switches, rockers, slide switches, and rotary switches which an operator uses to control various functions of the corresponding accessories.

Mechanical switches use a mechanical means to complete electrical contact. As a result, mechanical switches are prone to failure as their activation causes mechanical wear on their moving components and electrical contacts. Switch reliability declines and contact intermittent frequency increases over continued use. Repeated physical contact leads to deterioration of switch face legends and graphics. Mechanical switches are susceptible to contamination from external matter like dirt, food, and liquids. Ultimately, mechanical switches are expensive for automotive use. In today's automobile, mechanical switches as the controls of vehicle accessory control interfaces are responsible for some $400 or so of the automobile cost. As a result, automobiles are plagued by the problems associated with mechanical switches.

Besides their inherent physical drawbacks and cost, mechanical switches present opposition to automotive ergonomics by limiting vehicle styling and layout options. As part of a control interface for a vehicle accessory, mechanical switches are permanently fixed, numerous, and occupy significant large portions of the surface of the control interface. For example, a standard HVAC system requires controls for adjusting vent selection, blower motor speed, temperature, etc. The controls may be doubled to accommodate individual comfort control between the driver and a passenger. In a luxury class vehicle, the HVAC system may further require controls for heated mirrors, heated seats, rear passenger air flow, etc.

As vehicle accessories are augmented with additional features, the control interfaces for these accessories become increasingly complex. This is because additional accessory features create demand for more controls to accommodate operator control of the additional features. Adding mechanical switches increases the size of the control interface. If the control interface has a display associated with the accessory, then this may require expansion of the control interface to accommodate operator control of the additional features. Together the mechanical switches and the displays of a control interface consume valuable space of the surface of the control interface and increase overall cost.

Mechanical switches making up the controls of a control interface associated with an accessory must be arranged in a fashion that is comprehensive and intuitive to the operator. An excessive number of buttons or knobs clutters the control interface forcing the operator to hunt for desired switches. Sophisticated multi-function control knobs, those with switches that activate by tilting, pivoting, or swiveling, are obscure and difficult to maneuver for some operators. Furthermore, sophisticated control knobs have many intricate parts making them expensive and prone to failure.

For a vehicle accessory associated with a control interface, unique design consideration must be given to the control interface. The control interface must be accessible and convenient to operate and be visually appealing and demonstrate regard for operator safety.

SUMMARY OF THE INVENTION

The present invention is directed to the implementation of capacitive touch switches in place of mechanical switches for the input controls of control interfaces associated with accessories of a vehicle.

Capacitive touch switches, referred to as touch pads, are a practical solution to the problems associated with mechanical switches. Capacitive touch switches have a solid-state design that outlasts the lifetime of mechanical switches. Capacitive touch switches may operate from behind the surface of relatively thick non-conductive materials such as glass and are thus unaffected by external contamination. This characteristic gives automotive designers the option to implement control interfaces having large touch surfaces with customized exterior finishes that enhance the appearance of the surfaces of the control interfaces. Capacitive touch switches can be constructed thin and flexible thereby being able to follow complex contours of automobile surfaces. This provides designers the freedom to locate control interfaces onto surfaces not suitable for mechanical switches. Capacitive touch switches can be constructed to be optically transparent thereby allowing the controls of a control interface to overlay a display of the control interface. This concept of overlapping controls onto a display of a control interface reduces the surface of the control interface. Furthermore, when fashioned this way, the display can produce direct visual feedback of touch switch activation. This creates an instinctive ergonomic solution to vehicle-operator interfacing. Capacitive touch switches can be arranged to create custom control interfaces that can imitate anything from single button switch inputs to advanced two-dimensional touch arrays for recognizing multipoint inputs.

The expanding market of personal electronic devices with their remote wireless access and communications capabilities enables vehicles to have accessories that can be accessed remotely. Capacitive touch switches are readily implemented into portable communications devices like cell phones, personal audio/video players, personal digital assistants, and handheld computers. These devices can be used to wirelessly communicate with vehicle control systems to give operators remote control over vehicle accessories.

It is an object of the present invention to provide a control interface between a vehicle occupant and a vehicle for enabling the occupant to control an accessory of the vehicle in which the control interface allows for enhanced placement and styling of input controls on the surface of the control interface to create enhanced operator interaction with the control interface.

It is another object of the present invention to provide a vehicle accessory control interface having, as input controls, solid state switches based on capacitive touch technology in place of mechanical switches thereby improving switch reliability and lifetime and thus creating a cost savings for the vehicle manufacturer and customer.

It is another object of the present invention to provide a vehicle accessory control interface which operates on the principles of mutual capacitance sensing to achieve single point and multipoint sensing of human touch through relatively thick non-conductive surfaces. An advantage of mutual capacitance sensing over projected capacitance sensing is the ability to sense through thick surfaces including any combination of natural or synthetic material such as glass, plastic, wood, rubber, and leather up to one quarter inch thick.

It is another object of the present invention to provide a vehicle accessory control interface having single and multiple sensing regions (e.g., capacitive touch switches, touch pads) located at desired touch points on the surface of the control interface. The touch pads are placed on the surface of the control interface such as to create unique surface locations that when touched generate single point, multipoint, or two-dimensional coordinate information identifying the touched locations.

It is another object of the present invention to provide a vehicle accessory control interface having capacitive touch switches (touch pads) applied to the surface of the control interface laying directly over a display of the control interface using highly conductive, optically transparent materials like Indium Tin Oxide (ITO), clear conductive polymers, or other such material. In this configuration, the ITO is either applied directly to the surface of the control interface to create the desired touch switches or applied to a substrate film layer such as polyester which is then affixed to the surface of the control interface. Touch pads can be constructed on single or multiple substrate layers to achieve desired layout and performance characteristics. For applications not requiring optically clear control surfaces, ITO can be substituted with a conventional material like metal foil, conductive ink, metal film, or conductive epoxy.

It is another object of the present invention to provide a vehicle accessory control interface having capacitive touch switches interfaced to display devices to create visual feedback when touch occurs. This functionality is similar to that of standard touch screens. However, the present invention builds upon specific touch screen technology with touch screens that operate on the principles of mutual capacitance technology. In doing so, touch pads can be placed on the internal side of a display surface. Using mutual capacitance technology, touch pads can be located behind thicker display surfaces like glass and still be capable of multi-touch point recognition. Likewise, sensitivity thresholds for touch pads can be increased to detect the presence of a touch prior to the touch actually touching the surface of the control interface. This proximity detection capability permits displays to remain inactive, dimmed, or hidden until an approaching object such as a human finger is sensed. When the object is sensed, the display brightens or becomes active just prior to the object making touched contact.

It is another object of the present invention to provide a vehicle accessory control interface in which multiple vehicle accessories share electrical interface hardware and input controls of the control interface. By establishing common controls and displays of a control interface, monitoring and control of multiple vehicle accessories can occur in the same area of a vehicle like an instrument cluster or center stack console.

It is another object of the present invention to provide a vehicle accessory control interface having capacitive touch switches which can be arranged in various configurations. Based on sensing principles of mutual capacitance, the capacitive touch switches can be located behind, in front of, or within the surface of the control interface. Likewise, the capacitive touch switches can be tailored to follow intricate contours of the surface of the control interface and thus be made transparent for placement directly in front of a display of the control interface.

It is another object of the present invention to provide a vehicle accessory control interface having capacitive touch switches which operate based on the sensing principles of mutual capacitance in order to recognize inputs such as single point, multipoint simultaneous, multipoint sequential, and multipoint gestural commands occurring by proximity or touch. Using multiple touch switch inputs, gesturing on the control interface can be processed into operator input commands. Multiple gesture interpretation can be recognized and processed to create consecutive or simultaneous macro command sequences for controlling vehicle accessories.

It is another object of the present invention to provide a vehicle accessory control interface capable of personalized and restricted operator access. By placing a conductor in the operator's seat an electrical signal can be applied to the conductor to act as a carrier or signature signal that is then sensed by the control interface during touch. The control interface can determine whether the source of the input request is coming from the driver or a passenger. The request is allowed or restricted depending on the operator's usage rights.

It is another object of the present invention to provide a means of achieving remote access and control over vehicle accessories. By extending the use of capacitive touch switches to portable handheld electronics operable for wireless communications, remote access to vehicle accessories is possible. An operator can remotely interface with vehicle accessories to control and monitor their status.

In carrying out the above objects and other objects, the present invention provides a system for enabling an operator to control an accessory of a vehicle. The system includes a control interface and a processor. The control interface has a display surface and a touch area defined by an electrically conductive layer adjacent to a portion of the display surface. The conductive layer capacitively couples to an electrically conductive object upon the conductive object touching the touch area while the conductive layer is driven with an electrical charge. The processor is operable for driving the conductive layer with the electrical charge, detecting the capacitive coupling of the conductive layer to the conductive object upon the conductive object touching the touch area while the conductive layer is driven with the electrical charge, generating a signal indicative of the conductive object touching the touch area upon detecting the capacitive coupling of the conductive layer to the conductive object, and providing the signal to an accessory of a vehicle for controlling the accessory as a function of the conductive object touching the touch area.

Embodiments of the present invention provide an automotive-human interface system having a vehicle accessory control interface within an automotive surface and provided with a display surface and capacitive touch switches as input controls. The system further includes electronic drive circuitry and electronic touch detection circuitry. The capacitive touch switches are positioned in front of, within, or behind the display surface to detect the presence of human touch on the display surface and to detect and process motion gestures as specific input commands. The display surface may be anything from transparent to opaque material that can render changes to graphics or lighting to communicate visual acknowledgment of display surface touch. Haptic and audio feedback circuitry can provide an alternate or more comprehensive means of surface contact acknowledgment. The capacitive touch switches may be further sensitized to recognize human proximity without completing surface contact. Recognition of human presence before physical contact can be used to produce a response prior to actual touching of the display surface.

Embodiments of the present invention also provide a vehicle accessory control interface having input controls and one or more displays in which the control interface improves human interaction with the controls by centralizing active controls and hiding secondary controls that are less important or not required. Likewise, the accessibility to the controls is improved when the controls and a display are shared by multiple vehicle accessories. The opportunity to rearrange or block accessory controls and manipulate visual display information on vehicle control surfaces ultimately eliminates the design restrictions of conventional automotive control interface design. Combining vehicle interior design with the technology to process human gesturing as a means of vehicle accessory control stimulates the human experience.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Technology improvements and consumer appetite for more sophisticated vehicles stimulates automotive manufactures into developing feature rich accessories while expanding their list of vehicle options. With the increase in vehicle accessories and options, vehicle accessory control interfaces are more burdened than ever by the expanding size and complexity of accessory input controls. Successful management of the surfaces of vehicle accessory control interfaces requires a new look into how their input controls are presented to the operator.

Capacitive touch switches offer a solution to the reliability and cost concerns associated with mechanical switches commonly used as the input controls of vehicle accessory control interfaces. Capacitive touch switches can solve issues relating to control interface complexity and ergonomics that plague automotive interior designs.

Figure 1:
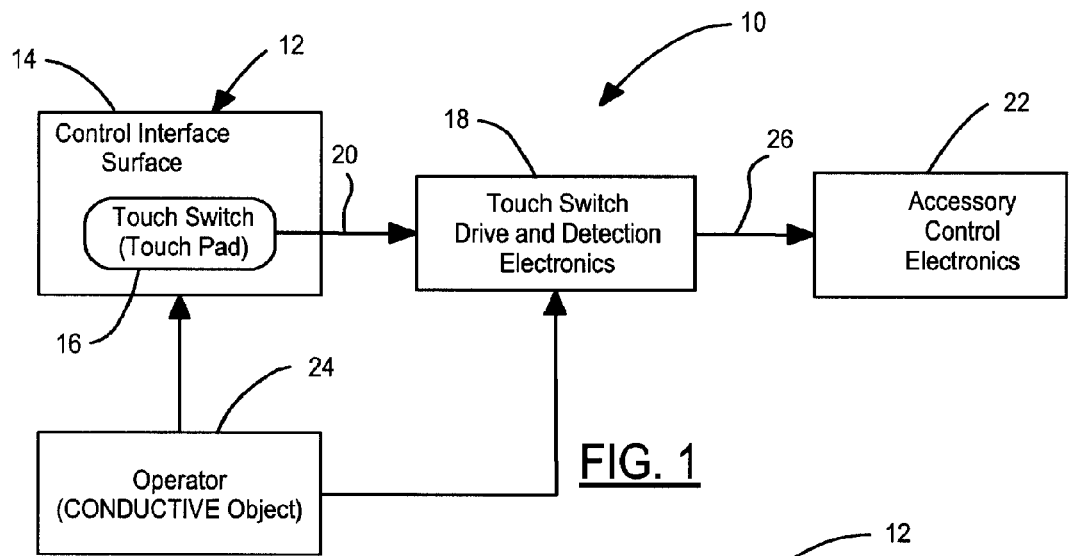
FIG. 1 illustrates a block diagram of a system having a vehicle accessory control interface in accordance with an embodiment of the present invention.

Referring now to FIG. 1, a block diagram of a system 10 having a vehicle accessory control interface 12 in accordance with an embodiment of the present invention is shown. Control interface 12 includes a surface 14. Control interface surface 14 is constructed from, for example, rigid, transparent, non-conductive material such as glass or plastic. Control interface 12 further includes one or more capacitive touch switches (i.e., touch pads) 16. Touch switches 16 are mounted either in front of, within, or behind control interface surface 14 at respective areas of control interface surface 14.

Control interface 12 is associated with one or more accessories of a vehicle. To this end, control interface 12 is mounted in a surface of the vehicle at an area of the vehicle accessible by a vehicle operator 24. Operator 24 can manipulate (i.e., directly touch or be in proximity with) touch switches 16 (e.g., "controls", "input controls", "touch pads") to control the functions of the vehicle accessories associated with control interface 12. Control interface surface 14 may function as a display which displays status of one or more of the vehicle accessories associated with control interface 12. To this end, control interface surface 14 is a display surface.

System 10 further includes touch switch drive and detection electronics 18. Drive and detection electronics 18 accompanies touch switches 16 to drive touch switches 16 with an electrical charge and to detect touch activation of touch switches 16 while touch switches 16 are driven with the electrical charge. Placement of drive and detection electronics 18 can either be with touch switches 16 on control interface surface 14 or separated from control interface 12 by an electrically conductive wire 20 (as shown in FIG. 1). Drive and detection electronics 18 can be integrated into a more elaborate control for increased functionality and reduced cost. While drive and detection electronics 18 drives touch switches 16, drive and detection electronics 18 generates signals indicative of activation of touch switches 16 in response to manipulation (for example, touching) of touch switches 16 by operator 24. A touch switch 16 while being driven with an electrical charge will activate upon being contacted by a conductive object such as a human finger as a result of touch switch 16 capacitively coupling with the conductive object. Similarly, if sensitive enough, a touch switch 16 while being driven with an electrical charge will activate upon a conductive object being in proximity with touch switch 16 as a result of touch switch 16 capacitively coupling with the conductive object.

System 10 further includes accessory control electronics 22. Accessory control electronics 22 is operable to control the functions of the accessories associated with control interface 12 in accordance with the activation of touch switches 16. To this end, accessory control electronics 22 receives the touch activation signals from drive and detection electronics 18 over an electrically conductive wire 26. In turn, accessory control electronics 22 controls the functions of the accessories associated with control interface 12 in accordance with the activation or control of touch switches 16.

Referring now to FIGS. 2a through 2f with continual reference to FIG. 1, different mounting configurations of capacitive touch switches 16 to control interface surface 14 in accordance with embodiments of the present invention are shown. FIGS. 2a through 2f illustrate a partial control interface 12 by showing only a handful of touch switches 16. The actual number of touch switches 16 depends on requirements of the complete control interface 12. Depending on size and strength requirements of control interface 12, control interface surface 14 is typically between 0.100 to 0.250 inches in thickness and is made of a material such as glass or plastic.

Figure 2A:
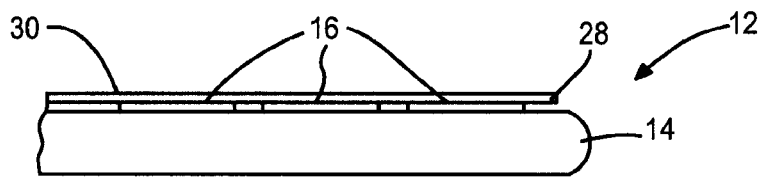
FIG. 2a illustrates a mounting configuration of capacitive touch switches to the surface of a vehicle accessory control interface in accordance with an embodiment of the present invention.

In the mounting configuration of FIG. 2a, touch switches 16 are located between the external side of control interface surface 14 and a non-conductive exterior layer 28. Layer 28 is placed as a protective shield to prevent direct operator contact to touch switches 16. Depending on how touch switches 16 are manufactured, layer 28 may also represent the substrate onto which touch switches 16 are initially constructed. Examples of this substrate are polycarbonate, acrylic, and polyester. In any case, operator contact occurs on the outer surface 30 of layer 28. Thickness of layer 28 is typically chosen at 0.005 to 0.015 inches depending on design requirements. It is a characteristic of touch switches 16 to exhibit increased signal strength as operator 24 approaches to initiate contact. For this reason layer 28 is preferred thin when covering touch switches 16 that exhibit weak sensitivity and hence decreased signal strength. This is because thin layer 28 compensates for weak touch switch signals by allowing operator 24 to obtain closer contact. Although it is not required that layer 28 be kept thin, this thickness presents a significant disadvantage in touch technologies different from that defined herein.

Figure 2B:
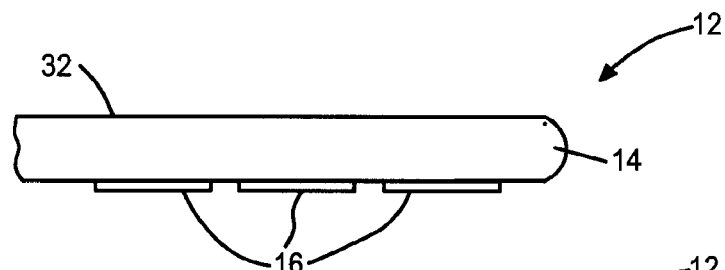
FIG. 2b illustrates another mounting configuration of capacitive touch switches to the surface of a vehicle accessory control interface in accordance with an embodiment of the present invention.

The mounting configuration in FIG. 2b represents the simplest approach of placing touch switches 16 onto control interface surface 14. In this configuration, touch switches 16 are placed directly onto the backside (i.e., internal side) of control interface surface 14 without a protective layer against touch switches 16. This is a cost effective approach provided that touch switches 16 do not require protection on the back side of control interface surface 14. Placing touch switches 16 onto the back side of control interface surface 14 clears external side 32 of control interface surface 14 (i.e., the side of control interface surface 14 presented to operator 24) from touch switch components and protective films. A designer is then free to transform external side 32 of control interface surface 14 to create whatever appearance is desired.

Figure 2C:
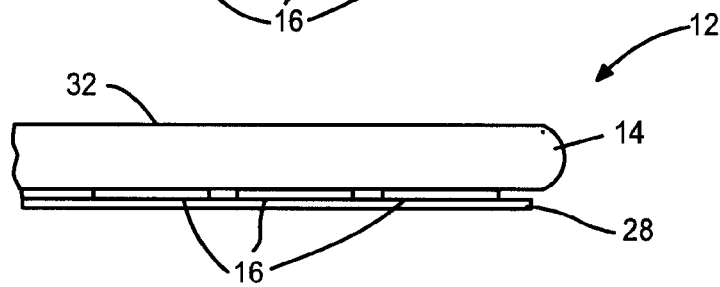
FIG. 2c illustrates another mounting configuration of capacitive touch switches to the surface of a vehicle accessory control interface in accordance with an embodiment of the present invention.

In the mounting configuration of FIG. 2c, touch switches 16 are located between the internal side of control interface surface 14 and a non-conductive exterior layer 28. This construction is similar to that found in FIG. 2a. Here layer 28 represents the substrate onto which touch switches 16 are initially constructed. Once assembled, layer 28 can double as a protective shield for touch switches 16, though protection may not be necessary as touch switches 16 are located on the backside of control interface surface 14. Here again placing touch switches 16 onto the internal side of control interface surface 14 clears external side 32 of control interface surface 14 from touch switch components and protective films. External side 32 of control interface surface 14 is then able to feature more appealing finishes.

Figure 2D:
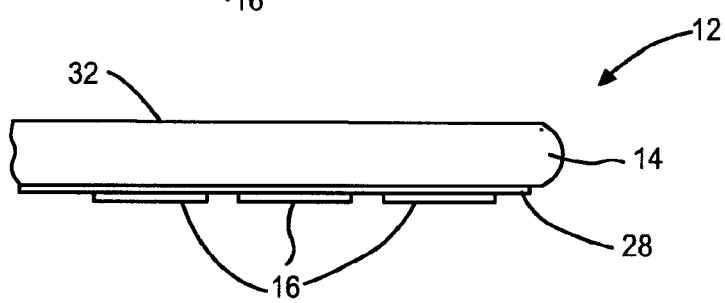
FIG. 2d illustrates another mounting configuration of capacitive touch switches to the surface of a vehicle accessory control interface in accordance with an embodiment of the present invention.

In the mounting configuration of FIG. 2d, a non-conductive layer 28 is placed on the internal side of control interface surface 14 and touch switches 16 are placed on layer 28. As a result, layer 28 is between the internal side of control interface surface 14 and touch switches 16. In this configuration, layer 28 with touch switches 16 thereon can be bonded to the internal side of control interface surface 14 without exerting bonding stress on touch switches 16.

Figure 2E:
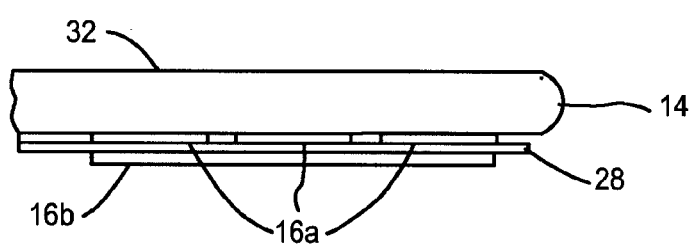
FIG. 2e illustrates another mounting configuration of capacitive touch switches to the surface of a vehicle accessory control interface in accordance with an embodiment of the present invention.

In the mounting configuration of FIG. 2e, two separate touch switch layers 16a, 16b are placed on respective sides of a non-conductive layer 28 with the first touch switch layer 16a being placed on the internal side of control interface surface 14. This configuration is desirable when two layers of touch switches 16 are necessary to meet the design requirements of control interface 12. A cost savings can be realized either in the manufacturing of touch switches 16 or by simplifying assembly of control interface 12 when this configuration is selected.

Figure 2F:
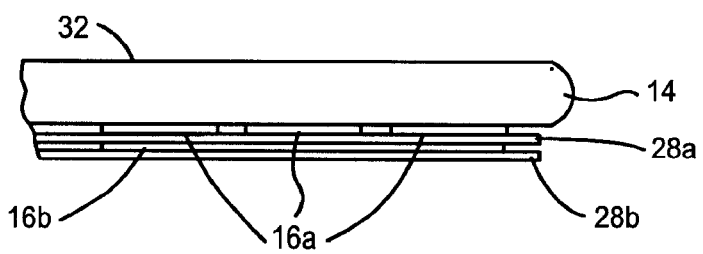
FIG. 2f illustrates another mounting configuration of capacitive touch switches to the surface of a vehicle accessory control interface in accordance with an embodiment of the present invention.

In the mounting configuration of FIG. 2f, two separate touch switch layers 16a, 16b are placed on respective sides of a first non-conductive layer 28a with the first touch switch layer 16a being placed on the internal side of control interface surface 14 and a second non-conductive layer 28b being placed over second touch switch layer 16b. Each layer of touch switches 16 is initially constructed as a single layer on separate substrates 28a, 28b. Once constructed, the individual substrates 28a, 28b are then stacked to create a multiple layer of touch switches 16.

Through rearrangement, substitution, or addition of the control interface components shown in FIG. 2a though 2f further variations of control interface 12 can be realized. For example, the configuration in FIG. 2f can be characterized as having two single layer substrates 28a, 28b. However, this configuration can also be characterized as having one double layer substrate 28a, as illustrated in FIG. 2e, along with one exterior substrate layer 28b as a form of protection. Likewise, the configuration in FIG. 2e can be constructed with more than two touch switch layers 16a, 16b. The touch switch layers 16a, 16b in FIG. 2e can be applied to external side 32 of control interface surface 14 to create multiple layer touch switches on external side 32 similar to the configuration in FIG. 2a.

Figure 3:
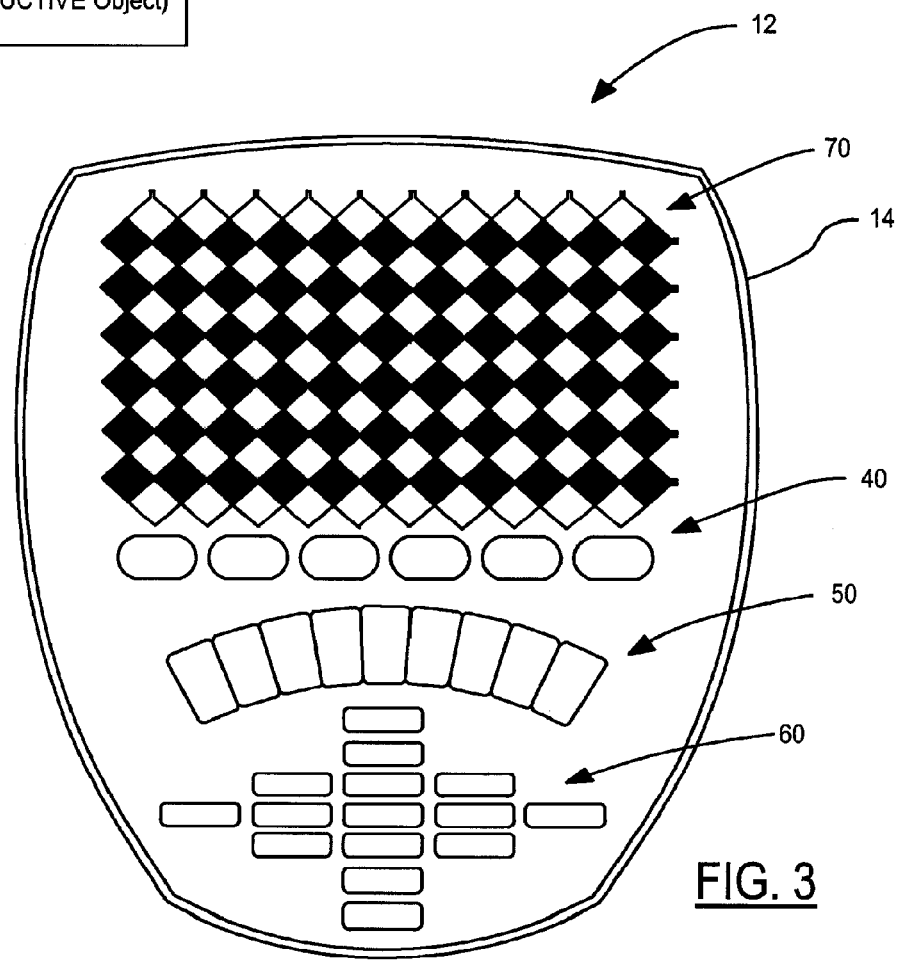
FIG. 3 illustrates a vehicle accessory control interface having capacitive touch switches arranged in an exemplary configuration in accordance with an embodiment of the present invention.

Referring now to FIG. 3, with continual reference to FIG. 1, a control interface 12 having capacitive touch switches 16 arranged in an exemplary configuration in accordance with an embodiment of the present invention is shown. Control interface surface 14 represents the accessory control area of an automobile center stack console. Touch switches 16 are spread out across control interface surface 14 to provide operator 24 with the access to control vehicle accessories like audio, HVAC, and navigation. Touch switches 16 are arranged in separate touch switch groups 40, 50, 60, and 70. As described in greater detail below with reference to FIGS. 4, 5, 6, and 7, touch switches 16 of each touch switch group are arranged in certain patterns and arrays.

In this example, touch switches 16 are shared among accessories to reduce the number of switches necessary for access to all available accessory functions. Likewise, control interface surface 14 is optically transparent for inclusion of a display device behind control interface surface 14. The display device can then project graphical images outward through control interface surface 14 to assist operator 24 in locating positions of active touch switch 16 and to communicate the accessory functions assigned to each touch switch 16. In this regard, control interface surface 14 is a display surface.

Figure 4:
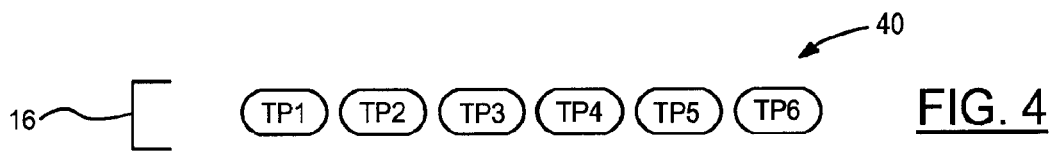
FIG. 4 illustrates a set of the capacitive touch switches of the vehicle accessory control interface shown in FIG. 3 arranged in an exemplary configuration for entering single input commands.

Referring now to FIG. 4, the arrangement of touch switches 16 of touch switch group 40 of control interface 12 shown in FIG. 3 will be described in greater detail. Touch switches 16 of touch switch group 40 are arranged in a configuration for entering single input commands. Touch switches 16 of touch switch group 40 are suited for use as accessory selection switches. Touch switch group 40, for instance, includes six touch switches 16. Each touch switch 16 can be assigned a primary accessory function like audio, HVAC, navigation, communications, or vehicle status reporting. Once control of a particular accessory is invoked, touch switch group 40 can modify its functionality to convert its touch switches 16 into secondary control touch switches that are exclusive to controlling the selected accessory.

Figure 5:
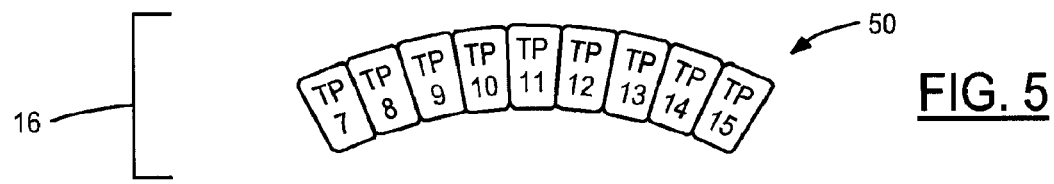
FIG. 5 illustrates another set of the capacitive touch switches of the vehicle accessory control interface shown in FIG. 3 arranged in an exemplary configuration for entering multiple sequential input commands.

Referring now to FIG. 5, the arrangement of touch switches 16 of touch switch group 50 of control interface 12 shown in FIG. 3 will be described in greater detail. Touch switches 16 of touch switch group 50 are arranged in a configuration for entering multiple sequential input commands. To this end, touch switches 16 of touch switch group 50 are arranged close together in an arched layout. This layout is useful for control interfacing imitating analog style control. Some examples of use are for adjusting temperature settings in an HVAC accessory; adjusting volume, tone, or balance settings in an audio accessory; or as a scrubber bar for browsing information of a navigation accessory. Touch switch group 50 includes, for instance, nine touch switches 16. However, switch detection electronics can process signal data from each of these nine input controls (i.e., touch switches 16) to generate at least seventeen distinct touch positions. Because of their close proximity to one another adjacent touch switches 16 can experience simultaneous activation when operator 24 makes contact with control interface surface 14. Adjacent touch switches 16 that experience simultaneous activation can then be interpreted as input points falling between adjacent touch switches 16. On the other hand, touch switch group 50 can be interpreted as fewer than nine touch switches 16 by either mapping switch inputs to a common command or ignoring activation of any number of the touch switch signals to emulate a fewer number of touch switches 16.

Figure 6:
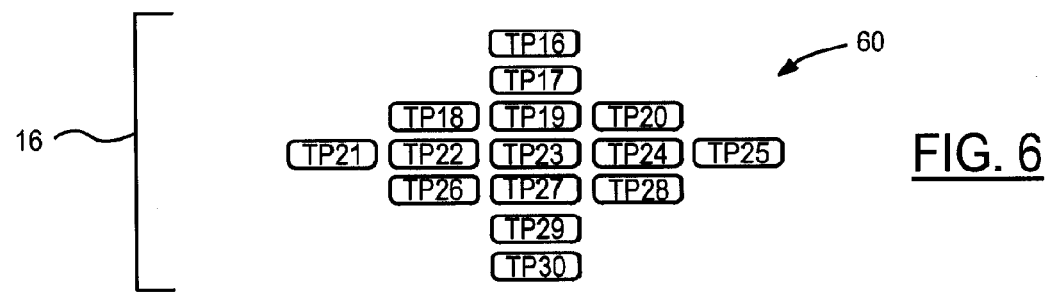
FIG. 6 illustrates another set of the capacitive touch switches of the vehicle accessory control interface shown in FIG. 3 arranged in an exemplary configuration for entering single input commands and multiple sequential input commands.

Referring now to FIG. 6, the arrangement of touch switches 16 of touch switch group 60 of control interface 12 shown in FIG. 3 will be described in greater detail. Touch switches 16 of touch switch group 60 are arranged in a configuration for entering single input commands and multiple sequential input commands. To this end, touch switches 16 of touch switch group 60 are arranged in respective arrays of single point touch switches 16. Each touch switch 16 can be activated to generate a specific input command similar to that of a mechanical switch. Additionally, touch switches 16 are intentionally arranged in respective arrays to accommodate touch input expressed in a gestural form. Activation of any one of touch switches 16 can prompt recognition of a single point input command. However, if sequential activation of more than one touch switch 16 should occur, then touch switch detection circuitry can perceive the touch sequence as an input gesture and not just as a series of single point input commands.

An application of the arrays of touch switches 16 of touch switch group 60 is for use as climate control adjustment in a vehicle. For example, tapping touch switch (touch pad) TP21 prompts a control to enter climate adjustment for the driver while tapping touch pad TP25 prompts climate adjustment for the passenger. After an occupant is selected, sequential activation of touch pads TP21-TP22-TP23-TP24-TP25 represents a command to increase fan speed for the selected occupant. Conversely, sequential activation of these touch pads 16 in the reverse order represents a command to reduce fan speed. At the same time, a sequential activation of touch pads TP16-TP17-TP19-TP23-TP27-TP29-TP30 represents the command to decrease temperature for the selected occupant, while touch pad activation in the reverse order represents a command to increase temperature.

Not all of touch switches 16 of a touch switch group need to be activated for the gestural command to be recognized. Realistically, only two touch switches 16 need to be activated sequentially for the command to be recognized. If touch switches 16 are arranged close enough then touch switch input signals can be processed to yield interpolated touch positions between adjacent touch pads. In this way, a series of touch switches 16 can be configured similarly to an analog control input such as a potentiometer. This feature is useful when trying to create precise set-point controls like temperature adjustment.

Figure 7:
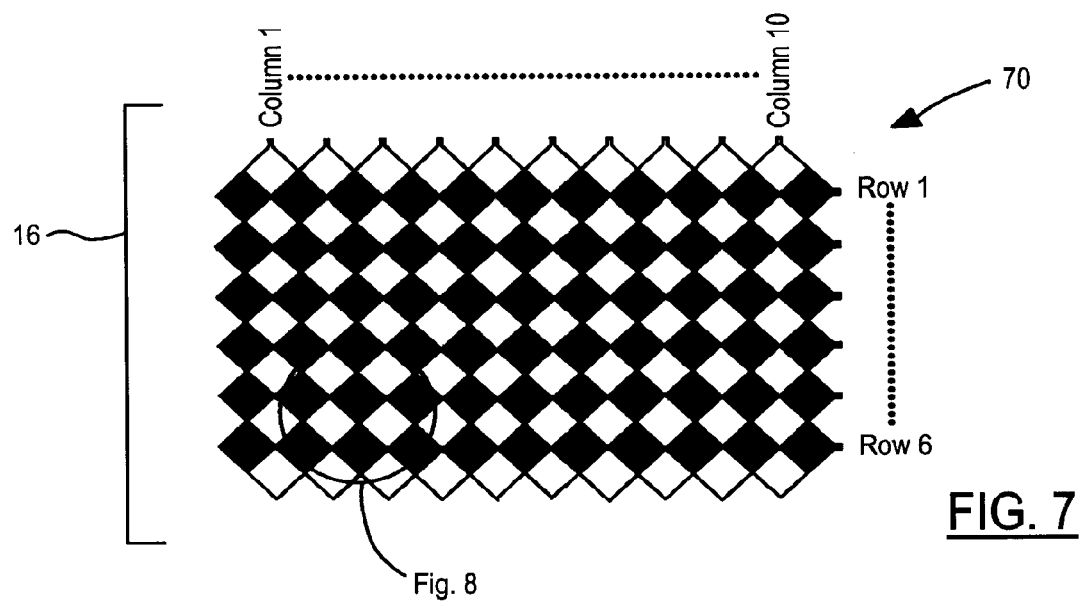
FIG. 7 illustrates another set of the capacitive touch switches of the vehicle accessory control interface shown in FIG. 3 arranged in an exemplary configuration for entering single input and multiple sequential input commands using a two-dimensional input array.
Figure 8:
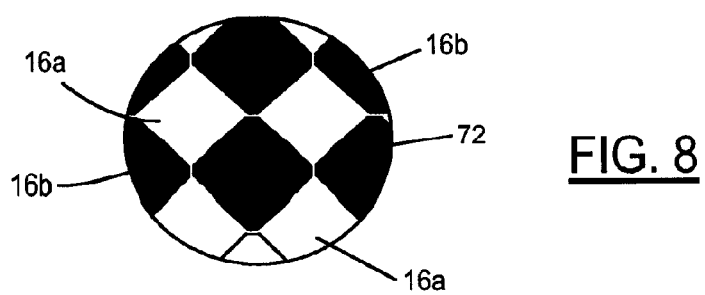
FIG. 8 illustrates a detailed view of a portion of the two-dimensional input array shown in FIG. 7.

Referring now to FIG. 7, the arrangement of touch switches 16 of touch switch group 70 of control interface 12 shown in FIG. 3 will be described in greater detail. Touch switches 16 of touch switch group 70 are arranged in a configuration for entering single input and multiple sequential input commands using a two-dimensional input array. As such, touch switches 16 are arranged in touch switch columns 16a and touch switch rows 16b. Touch switch columns 16a and rows 16b are separated from one another by a substrate layer 28 as detailed in FIGS. 2e and 2f. The individual touch switch columns 16a and rows 16b called out in the magnified view of FIG. 8 are formed by sequentially connected touch switches 16. Each string of touch switches 16 making up a touch switch column 16a or row 16b is positioned so as to minimize an overlap area 72 common to both touch switch columns 16a and rows 16b. This is done to reduce signal cross talk between touch switch columns 16a and rows 16b. Additionally touch switches 16 may be slightly reduced in size to produce areas void of touch pad material on both sides of substrate 28 to further minimize overlap 72 and cross talk between touch switch layers 16a, 16b.

When operator 24 touches control interface surface 14 the area of contact falls either on or near a touch switch column 16a and row 16b. The input signal read on each touch switch column 16a and row 16b then represents the location where operator 24 is proximal to or touching control interface surface 14. If touch switch columns 16a and rows 16b are designed small enough then the operator contact area will include both a touch pad column 16a and row 16b. When contact is not directly over a touch switch column 16a or row 16b then position is interpolated by reading the input signal from the two closest touch switch columns 16a and rows 16b. As all touch switch columns 16a and rows 16b sense independently, it is possible to identify a multitude of contact areas within array 70. This characteristic makes array 70 capable of simultaneous multi-point recognition. One or more touch locations are then identified by the intersecting points of high signal strength.

Because of their close proximity to one another, adjacent touch switch columns 16a and rows 16b can produce an input signal when operator 24 makes contact between them on control interface surface 14. Adjacent touch switch columns 16a and rows 16b experiencing simultaneous input signal can then be interpreted as input points that fall between adjacent touch switch columns 16a or rows 16b.

Technologies such as resistive touch screens are established as position sensing touch panels. However, resistive touch screens do not completely address the problems associated with mechanical switches. Resistive touch screens must be placed on the external side of a control interface surface where they are continuously subjected to activation pressures and must lay flat and have a simple footprint such as a square or a rectangle. Their application is limited both by their geometry and durability. Capacitive touch sensors (i.e., capacitive touch switches) are a better solution for applications that can benefit from interface surfaces with complex geometries. Likewise placement of capacitive touch sensors behind or within the control interface surface completely hides the electrical components to produce a clean and natural appearing surface.

Figure 9:
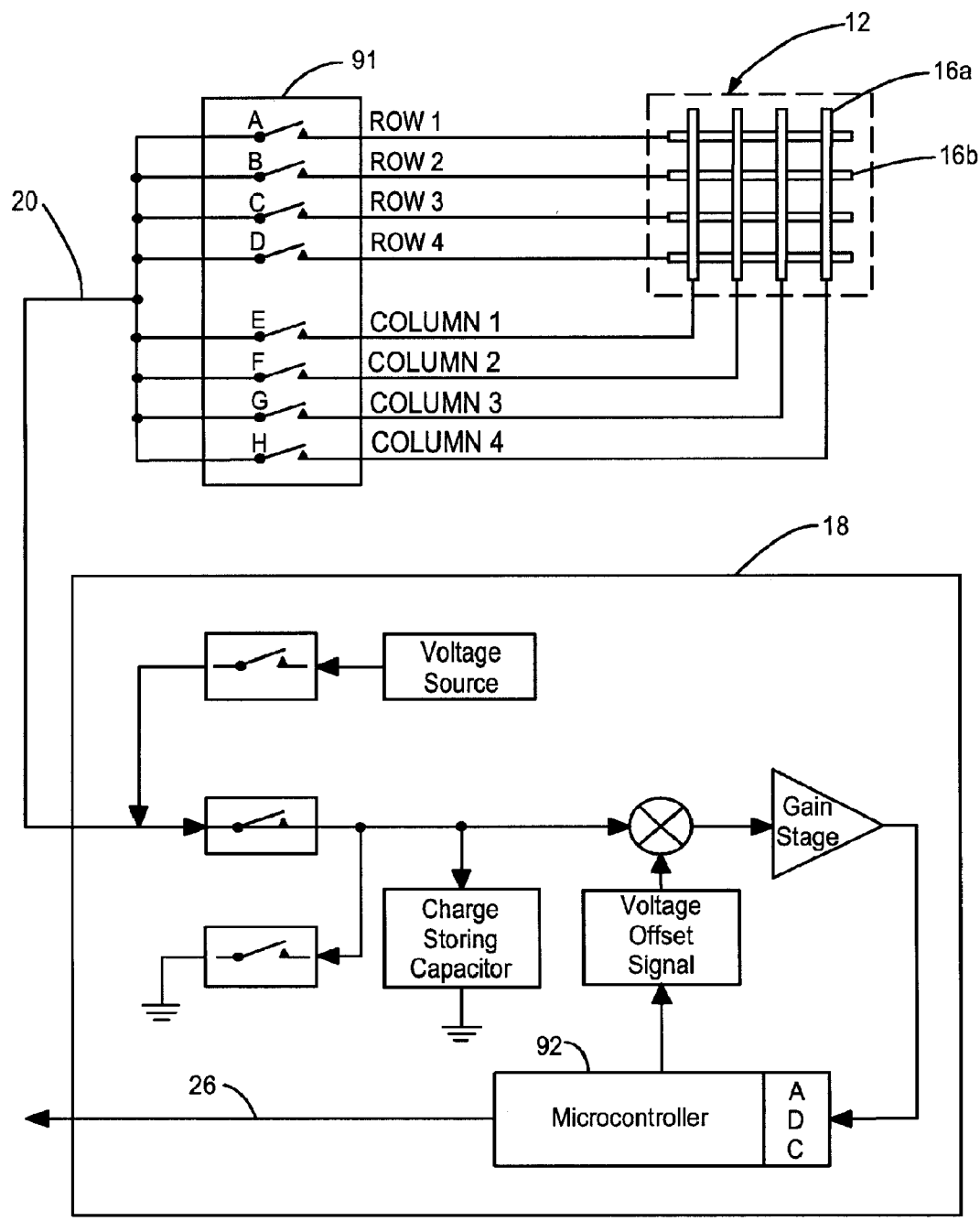
FIG. 9 illustrates an electrical circuit diagram of the capacitive touch electronics of a vehicle accessory control interface for reading multiple touch switch inputs into a one input touch switch drive and detection circuit in accordance with an embodiment of the present invention.

Referring now to FIG. 9, with continual reference to FIG. 1, an electrical circuit diagram of the capacitive touch electronics of control interface 12 for reading multiple touch switch inputs 16 into a one input touch switch drive and detection circuit 18 in accordance with an embodiment of the present invention is shown. This electrical circuit diagram illustrates exemplary electronic circuitry for operating a multitude of capacitive touch sensors 16 arranged as an array. The outlined circuitry block 18 represents a single input drive and detection circuit for measuring the capacitive signal developed on a touch sensor 16.

In this example, switches A through H of a multiplexor 91 provide solid state switching between touch sensors 16 and drive and detection electronics in a multiplexed fashion which permits one drive and detection circuit 18 to sense input on eight independent touch sensors 16. When solid state switch A of multiplexor 91 is closed, drive and detection circuitry 18 becomes electrically connected to touch sensor 16b that is connected to ROW 1. Drive and detection circuitry 18 turns each solid state switch 16 on in progression to read each of the four touch switch columns 16a and rows 16b independently. This successive multiplexed reading of touch inputs has the benefit of reducing the number of inputs and components required by drive and detection circuit 18.

Drive and detection circuitry 18 demonstrates use of a microprocessor 92 to control the multiplexing and sensor reading tasks. However, drive and detection circuitry 18 could employ an ASIC or other such highly integrated circuit.

Position interpolation is possible by measuring capacitive signal strength developed on adjacent touch switches 16, columns 16a, and rows 16b and then interpolating actual touch position by comparing the read signal strengths on two adjacent touch switch columns 16a or rows 16b. This effectively increases resolution without additional hardware.

The output response from drive and detection circuitry 18 can be individual signals for each touch switch 16 or a serial data stream. They can represent an activated touch switch 16 or simply signal strength on each touch switch 16 to be processed further by accessory control electronics 22.

When reading a touch switch 16 the input signal acquired by drive and detection circuitry 18 is a numerical value representing the amount of electrical charge developed on the touch switch as a result of capacitance coupling to its surroundings. For a single switch input the value of measured charge can be compared directly to a threshold value to determine if activation of touch switch 16 has occurred. Another detection method is to compare the value of measured charge against a previously read value to determine if a change in signal has occurred. The measured value then represents an amount of change over time.

When sufficient signal is sensed on a touch switch array of control interface 12 and is detected by drive and detection circuitry 18 as moving from one coordinate location to another in time, then this sequence of touch coordinates can be captured by drive and detection circuitry 18 and decoded as a gestural input command. Gestural command inputs can be used to communicate special instructions by the operator to the accessory control. For example a touch gesture tracing the outline of a circle or partial arc on the touch switch array may represent a command to rotate or turn a virtual control knob that is represented on a display behind control interface surface 14. Tracing an X on the touch switch array could signify the canceling of a function while tracing a check mark might communicate acceptance or completion of accessory adjustments.

A unique characteristic of capacitive touch sensors 16 of control interface 12 is their ability to detect an approaching object before the object makes contact with control interface surface 14. This characteristic is useful when implementing wakeup response on a 'dead' control interface 12. In doing so, control interface 12 can remain darkened or inactive until operator 24 comes within range of control interface surface 14 at which time control interface 12 will acknowledge operator 24 by activating the display, lighting the control interface panel, sending an audible wake-up confirmation, or other such feedback response to inform operator 24 that their presence or approach is recognized.

There are at least four ways to perform the proximity detection function of control interface 12 using capacitive touch switches 16. In a first method, the sensitivity threshold used by drive and detection electronics 18 to determine activation of a touch switch 16 can be lowered. This makes touch switches 16 more sensitive to approaching or proximal objects by reducing the amount of input signal that must develop on a touch switch 16 before activation is declared by drive and detection electronics 18. In a second method, proximity detection signal values are read from a multitude of touch switches 16 and mathematically summed by drive and detection electronics 18. This creates a collective signal value having a greater magnitude of change in response to an object approaching or proximal to control interface surface 14. In a third method, a multitude of touch switches 16 are connected together to create a touch switch 16 having greater surface area. This is accomplished by turning on two or more of touch switches 16 in multiplexor 91 to electrically join individual touch switches 16 together. By increasing switch surface area the signal input of drive and detection electronics 18 will develop greater signal change to approaching or proximal objects. This effectively makes the touch switch surface more sensitive. In a fourth method, control interface 12 has dedicated touch sensor areas or regions about control interface surface 14 having characteristically high sensitivity for detecting approaching or proximal objects. These touch sensor areas can be placed adjacent to or intermixed among touch switches 16. Likewise, the touch sensor areas can be placed on separate conductive layers.

Any combination of the four noted proximity detection methods can be implemented to achieve the desired characteristics of proximity detection to an approaching or proximal object. Proximity detection can be implemented across the touch interface surface or selectively controlled by sensing the capacitive signal on desired touch switches 16 and touch areas.

With proximity detection, gestural commands can be captured and processed in a three dimensional form. The variations in touch switch signal strength along with touch switch location and signal time tracking provide a three dimensional gesturing palette on control interface surface 14. Recognition of hand gesturing above control interface surface 14 now takes on a third component of depth or distance as processed by touch switches 16 as signal strength. In this way, proximity detection is suited for advanced gesture recognition by processing not only multipoint and sequential point gestures in the time domain but also adding a third component of depth that can be translated for true gestural input.

Another method of vehicle accessory control utilizes portable handheld electronic devices with wireless communications capability. Such devices include cell phones, PDAs, laptops, and netbook computers and can be used to remotely interface with and gain access to vehicle accessories. Using wireless communications standards like WiFi, Bluetooth, 3G, and ZigBee, an operator 24 can remotely access a vehicle and its accessories. Vehicle accessories equipped with wireless communications or linked on internal networks to devices having wireless communications capability give operator 24 a wireless access point to communicate with the vehicle. In doing such, operator 24 can receive real time vehicle status while away from the vehicle. Likewise, operator 24 can control vehicle accessories from personal electronic devices without having to be near their vehicle. Remote communications with the vehicle allows operator 24 to monitor vehicle security status. Vehicle accessories like HVAC, sunroof, and window lift controls can be accessed to adjust vehicle ventilation and temperature characteristics. Personal electronic devices can connect with vehicle accessories like audio head units and video players to share AV files and information. Likewise, wireless portable devices can link with vehicle electronics to exchange information like contact lists, appointments, notes, etc.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A system for enabling an operator to control an accessory from a remote device, the system comprising:
    a control interface including a display panel;
    the display panel including an electronically non-conductive touch surface and a plurality of touch areas, each of the touch areas being defined by a single electrically conductive pad and the touch areas forming a two-dimensional array of a plurality of electrically conductive rows and columns and each of the electrically conductive rows and columns being independent of one another, wherein the conductive pads individually capacitively couples to an electrically conductive object, moving into close proximity to at least one of the conductive rows and columns, while being driven with an electrical charge;
    a single input drive and detection circuit for measuring the capacitive signal developed on each conductive pad, the input and drive detection circuit being configured to turn each conductive pad on in progression to read each of the electrically conductive rows and columns independently; and
    the input drive and detection circuit including a processor detecting the capacitive coupling of the at least one of the conductive rows and columns to the conductive object, generating a signal and providing the signal wirelessly to one of an accessory and remote device, based on a first movement, followed by a second movement when a pattern or sequence has been detected, remotely communicating to a wireless device using a transceiver associated with the processor, and controlling at least one of the accessory and remote device in accordance with an output command from the wireless device.

2. The system of claim 1, wherein at least one of the display panel and the conductive rows and columns is optically transparent.

3. The system of claim 1, wherein the conductive rows and columns are optically transparent and comprised of one of an indium tin oxide and a clear conductive polymer.

4. The system of claim 1, wherein the touch surface acts as a support for attachment of a conductive pad to a portion of the display panel.

5. The system of claim 1, wherein the conductive rows and columns is situated between a support and a portion of an internal side of the touch surface of the display panel facing opposite an external side that is accessible for being approached by the conductive object.

6. The system of claim 1, wherein the processor determines the output command in response to a multipoint touch input of the conductive object on the touch area.

7. The system of claim 1, wherein the processor achieves proximity detection of an electrically conductive object to the touch area by lowering a sensitivity threshold of the processor to make the touch area more sensitive to nearby electrically conductive objects.

8. The system of claim 1, wherein the processor determines the output command in response to sequential single point touch inputs of the conductive object on the touch area.

9. The system of claim 1, wherein the display panel comprises a non-conductive material and includes at least one of glass and plastic.

10. A system for enabling an operator to control an accessory from a remote device, the system comprising:
   a control interface including a display;
   the display including a touch surface and a plurality of touch areas, each of the touch areas being defined by a single electrically conductive pad situated between a support and a portion of the touch surface and the touch areas forming a two-dimensional array of a plurality of electrically conductive rows and columns and each of the electrically conductive rows and columns being independent of one another, wherein each of the touch areas individually capacitively couples to an electrically conductive object moving into close proximity to at least one of the conductive rows and columns while being driven with an electrical charge;
   a single input drive and detection circuit for measuring the capacitive signal developed on each conductive pad, said input and drive detection circuit being configured to turn each conductive pad on in progression to read each of the electrically conductive rows and columns independently; and
   the input drive and detection circuit including a processor detecting the capacitive coupling of the at least one of the conductive rows and columns to the conductive object, generating a signal, providing the signal wirelessly to at least one of a plurality of accessories based on a first movement, followed by a second movement when a pattern or sequence has been detected, communicating to a wireless remote device using a transceiver associated with the processor, and controlling the least one of a plurality of accessories in accordance with an output command from the wireless remote device.

11. A system for enabling an operator to control an accessory from a remote device, the system comprising:
   a control interface including a display panel;
   the display panel including a touch surface and a plurality of touch areas, each of the touch areas being defined by a single electrically conductive pad and the touch areas forming a two-dimensional array of a plurality of electrically conductive rows and columns and each of the electrically conductive rows and columns being independent of one another, each of said plurality of electrically conductive rows and columns being formed by sequentially connected said touch areas, wherein each of the touch areas individually capacitively couples to an electrically conductive object moving into close proximity to at least one of the conductive rows and columns while being driven with an electrical charge;
   a single input drive and detection circuit for measuring the capacitive signal developed on each conductive pad, said input and drive detection circuit being configured to turn each conductive pad on in progression to read each of the electrically conductive rows and columns independently; and
   the input drive and detection circuit including a processor detecting the capacitive coupling of the at least one of the conductive rows and columns to the conductive object, generating a signal, providing the signal wirelessly to at least one of a plurality of accessories and remote device based on a first movement, followed by a second movement when a pattern or sequence has been detected, communicating to a wireless device using a transceiver associated with the processor, and controlling the least one of a plurality of accessories in accordance with an output command from the wireless device, wherein the processor achieves proximity detection of the electrically conductive object to at least one of the touch areas by lowering a sensitivity threshold of the processor to make the touch area more sensitive to nearby electrically conductive objects.

* * * * *